US012639222B2

(12) United States Patent
Bull

(10) Patent No.: US 12,639,222 B2
(45) Date of Patent: May 26, 2026

(54) HANDLING LOOKUP REQUESTS FOR STORAGE CIRCUITRY

(71) Applicant: Arm Limited, Cambridge (GB)

(72) Inventor: David Michael Bull, Cambridge (GB)

(73) Assignee: Arm Limited, Cambridge (GB)

( * ) Notice: Subject to any disclaimer, the term of this patent is extended or adjusted under 35 U.S.C. 154(b) by 94 days.

(21) Appl. No.: 18/817,421

(22) Filed: Aug. 28, 2024

(65) Prior Publication Data

US 2026/0064594 A1 Mar. 5, 2026

(51) Int. Cl.
*G06F 12/0802* (2016.01)
*G06F 12/12* (2016.01)
(52) U.S. Cl.
CPC .......... *G06F 12/0802* (2013.01); *G06F 12/12* (2013.01)
(58) Field of Classification Search
None
See application file for complete search history.

(56) References Cited

U.S. PATENT DOCUMENTS

| | | | | |
|---|---|---|---|---|
| 6,397,297 B1 * | 5/2002 | Sperber | ............... | G06F 12/0897 |
| | | | | 711/E12.043 |
| 2018/0203802 A1 * | 7/2018 | Alves | ................. | G06F 12/0862 |

| | | | | |
|---|---|---|---|---|
| 2020/0371964 A1 * | 11/2020 | Bhoria | .................. | G06F 12/128 |
| 2022/0188230 A1 * | 6/2022 | Song | .................... | G06F 12/0246 |
| 2022/0200783 A1 * | 6/2022 | Unterluggauer | ...... | G06F 12/121 |
| 2023/0350814 A1 * | 11/2023 | Unterluggauer | .... | G06F 12/0811 |
| 2024/0241832 A1 * | 7/2024 | Dutta | .................. | G06F 12/0895 |
| 2024/0256453 A1 * | 8/2024 | Nowatzyk | .......... | G06F 12/0891 |
| 2024/0345959 A1 * | 10/2024 | King | .................... | G06F 9/5022 |
| 2025/0110743 A1 * | 4/2025 | Gago Alonso | ........ | G06F 9/3806 |

* cited by examiner

*Primary Examiner* — Edward J Dudek, Jr.
*Assistant Examiner* — Ralph A Verderamo, III
(74) *Attorney, Agent, or Firm* — NIXON & VANDERHYE P.C.

(57) ABSTRACT

An apparatus comprises control information storage to store a plurality of entries of control information for controlling data processing operations relating to a given memory address; eviction storage to store a plurality of entries that have been evicted from the control information storage; lookup handling circuitry to control handling of a lookup request for data corresponding to a target memory address. When in a parallel mode, the lookup handling circuitry controls the control information storage and the eviction storage to perform the lookup request in parallel; and when in a serial mode, the lookup handling circuitry controls the control information storage to perform the lookup request, and controls the eviction storage to perform the lookup request in response to the lookup request missing in the control information storage. Mode control circuitry controls whether the lookup handling circuitry is to operate in the parallel mode or the serial mode.

20 Claims, 12 Drawing Sheets

HANDLING LOOKUP REQUESTS FOR STORAGE CIRCUITRY

BACKGROUND

Technical Field

The present technique relates to the field of data processing, and in particular to handling lookup requests in storage circuitry.

Technical Background

Data processing devices may provide storage structures for storing control information for controlling processing operations. Increasing a number of entries which may be supported by control information storage may provide improved performance, as it may increase the likelihood that control information for a particular processing operation is stored in the control information storage and can hence be accessed more quickly. However, power required to access control information storage may scale poorly with increased numbers of entries.

SUMMARY

At least some examples of the present technique provide an apparatus comprising: control information storage configured to store a plurality of entries of control information for controlling data processing operations relating to a given memory address; eviction storage configured to store a plurality of entries that have been evicted from the control information storage; lookup handling circuitry configured to control handling of a lookup request for data corresponding to a target memory address, wherein: in a parallel mode, the lookup handling circuitry is configured to control the control information storage and the eviction storage to perform the lookup request in parallel; and in a serial mode, the lookup handling circuitry is configured to control the control information storage to perform the lookup request, and to control the eviction storage to perform the lookup request in response to the lookup request missing in the control information storage; and mode control circuitry configured to control whether the lookup handling circuitry is to operate in the parallel mode or the serial mode.

At least some examples of the present technique provide a system comprising: the apparatus as described above implemented in at least one packaged chip; at least one system component; and a board, wherein the at least one packaged chip and the at least one system component are assembled on the board.

At least some examples of the present technique provide a chip-containing product comprising the system described above, assembled on a further board with at least one other product component.

At least some examples of the present technique provide a method comprising: storing, in control information storage, a plurality of entries of control information for controlling data processing operations relating to a given memory address; storing, in eviction storage, a plurality of entries that have been evicted from the control information storage; controlling handling of a lookup request for data corresponding to a target memory address, wherein: in a parallel mode, controlling the control information storage and the eviction storage to perform the lookup request in parallel; and in a serial mode, controlling the control information storage to perform the lookup request, and to control the eviction storage to perform the lookup request in response to the lookup request missing in the control information storage; and controlling whether the lookup handling circuitry is to operate in the parallel mode or the serial mode.

At least some examples of the present technique provide an apparatus comprising: a cache configured to store a plurality of entries of data; an eviction cache to store a plurality of entries that have been evicted from the cache; lookup handling circuitry configured to control handling of a lookup request for data corresponding to a target memory address, wherein: in a parallel mode, the lookup handling circuitry is configured to control the cache and the eviction cache to perform the lookup request in parallel; and in a serial mode, the lookup handling circuitry is configured to control the cache to perform the lookup request, and to control the eviction cache to perform the lookup request in response to the lookup request missing in the cache; and mode control circuitry configured to control whether the lookup handling circuitry is to operate in the parallel mode or the serial mode.

Further aspects, features and advantages of the present technique will be apparent from the following description of examples, which is to be read in conjunction with the accompanying drawings.

DESCRIPTION OF EXAMPLES

Figure 1:
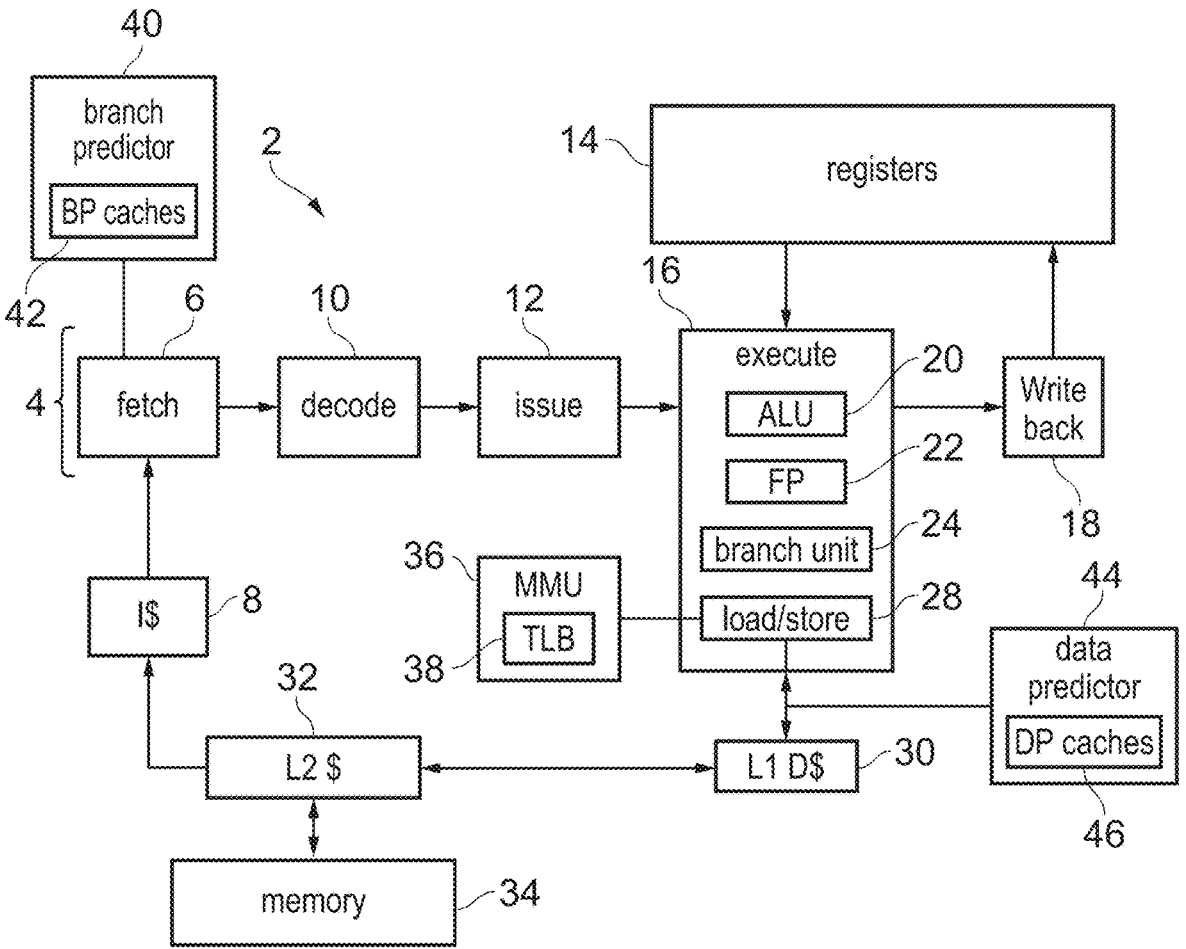
FIG. 1 illustrates an example of an apparatus comprising several instances of control information storage.

In accordance with some example embodiments, there is provided an apparatus comprising control information storage configured to store a plurality of entries of control information for controlling data processing operations relating to a given memory address. A lookup may be performed in the control information storage to determine whether the control information storage is holding control information for controlling a particular data processing operation. If such control information is not present, then the control information may be fetched from memory or the data processing operation may be controlled based on a default behaviour.

For scaling the control information storage to hold more control information, one approach could be to simply implement a larger capacity storage structure to accommodate additional entries. One problem with this approach is that as the capacity of the storage structure increases, signal delays during a lookup operation also increase, which could then impact whether circuit timing demands can be met. This problem is then exacerbated for processing apparatuses with higher clock frequencies.

Another approach is to provide the apparatus with eviction storage configured to store a plurality of entries that have been evicted from the control information storage. This then allows for evicted entries to be temporarily retained. In accordance with the present techniques, the apparatus is further provided with lookup handling circuitry configured to control handling of the lookup request for data corresponding to the target memory address mentioned above. The lookup handling circuitry is operable to cause the lookup request to be handled in a parallel mode or a serial mode under the control of mode control circuitry.

In the parallel mode, the lookup handling circuitry controls the control information storage and the eviction storage to perform the lookup request in parallel. Accordingly, the eviction storage therefore behaves as an extension of the control information storage, thereby effectively providing additional capacity. Accordingly, if the control information storage misses and the eviction storage hits on an entry (i.e. an entry that had previously been evicted from the control information storage), the control information is returned from the hit entry in the eviction storage. Therefore, when in the parallel mode, the additional effective capacity of the control information storage allows more control information to be stored, thereby improving performance by reducing the likelihood of having to fetch control information from memory or control the data processing operation based on a default behaviour.

In the serial mode, the lookup handling circuitry controls the control information storage to perform the lookup request and then controls the eviction storage to perform the lookup request in response to the lookup request missing in the control information storage. Since a lookup in the eviction storage is performed in response to a miss in the control information storage (i.e. when there is a hit in the control information storage, a lookup may not be performed in the eviction storage at all), the serial mode may be used to save power.

As mentioned above, the apparatus is provided with mode control circuitry, thereby allowing the apparatus to dynamically switch between the parallel mode and the serial mode. Accordingly, the apparatus may be used to improve performance or reduce power consumption as desired. The mode control circuitry may switch the mode based on a number of different inputs.

In some examples, the mode control circuitry is configured to maintain a utilisation metric indicative of a utilisation of the control information storage and the eviction storage. The utilisation metric may be indicative of whether the control information storage has sufficient capacity for the current workload. The mode control circuitry uses the metric to control whether the lookup handling circuitry is to operate in the parallel mode or the serial mode. For example, if the utilisation metric indicates that the control information storage does not have sufficient capacity for the current workload, then the mode control circuitry may switch the lookup handling circuitry to the parallel mode to use the additional capacity of the eviction storage as described above. Alternatively, if the utilisation metric indicates that the control information storage does have sufficient capacity for the current workload, then the mode control circuitry may switch the lookup handling circuitry to the serial mode to save power.

To maintain the utilisation metric, the mode control circuitry may monitor a number of hits in the control information storage and the eviction storage during a predetermined sample period. Accordingly, if the number of hits is low, then the current workload may not be encountering any limitation or bottleneck due to the available capacity of the control information storage alone. Hence, the utilisation metric may be set based on that number of hits such that the mode control circuitry controls the lookup handling circuitry to operate in the serial mode. Alternatively, if the number of hits is high, then the current workload may benefit from the additional capacity that is provided when the lookup handling circuitry is operating in the parallel mode.

In some examples, tracking circuitry is provided to track the utilisation of the control information storage and the eviction storage using a bitmap representative of the plurality of entries in the control information storage and a bitmap representative of the plurality of entries in the eviction storage. It will be appreciated that the bitmaps may be maintained separately or in a single central bitmap. Since each entry may be represented with as little as a single bit, a bitmap provides an efficient way of tracking the utilisation with little hardware cost. In various examples, different levels of bitmap granularity may be implemented for representing the entries. With a finer granularity, one bit may represent a single entry, whereas with a coarser granularity, one bit may represent multiple entries. It will be appreciated therefore that a coarser granularity results in the bitmap containing fewer bits, thereby further reducing the hardware cost.

When using a bitmap, the tracking circuitry is responsive to a hit signal indicative of a given entry in the control information storage of the eviction storage to set a corresponding bit in the bitmap. Then, in response to expiry of a predetermined sample period, the mode control circuitry sets the utilisation metric based on the number of set bits in the bitmap. By setting bits in response to hits, the bitmap is therefore representative of a first hit for each entry. If an entry is hit several times, the bitmap still only records that one entry has been hit. This provides an indication of how much of the available capacity is being utilised by a current workload, so that the utilisation metric can be set accordingly. For example, if the number of set bits is greater than a threshold, then it may be determined that additional capacity for storing control information is required. Therefore, the utilisation metric may be set such that the lookup handling circuitry is controlled to operate in the parallel mode.

Alternative or in addition to the utilisation metric, the mode control circuitry may maintain an eviction storage hit rate metric indicative of a fraction of lookup requests in the eviction storage that detect a hit. Such a metric can be used to estimate the difference in performance that may be obtainable by switching to the parallel mode. Accordingly, the eviction storage hit rate metric may be maintained at least when the lookup handling circuitry is operating in the serial mode because the indication of a sufficiently large performance increase may be a trigger by which the mode is changed to the parallel mode. It will be appreciated that the eviction storage hit rate metric could also be maintained when the lookup handling circuitry is operating in the parallel mode, for example to determine when the mode should be changed back to the serial mode.

One example for tracking the eviction storage hit rate metric includes the mode control circuitry being provided with a counter, where the value of the counter is indicative of a number of hits in the eviction storage. The eviction storage hit rate metric may be updated periodically according to a predetermined sampling period, which in some examples may be a predetermined amount of time, a number of cycles, or a number of received lookup requests. Upon expiry of the predetermined sampling period, the abovementioned fraction of lookup requests that detect a hit can be identified, for example using a measured number of lookups performed in the eviction storage or, where high precision is less justified, a notional assumed number of lookups that would be expected during the predetermined sampling period. The counter may then be reset to begin counting for the next predetermined sampling period.

Another example for tracking the eviction storage hit rate metric is the mode control circuitry being provided with history storage circuitry configured to store a hit history indicative of entries that have been hit in the eviction storage. For example, the history storage circuitry may comprise a buffer in which the hit data indicative of entries that have been hit in the eviction storage is temporarily stored. In some examples, the buffer may comprise a rolling buffer (e.g. a ring buffer) where hit history relating to older lookups in the eviction storage is continuously overwritten by hit history relating to younger lookups in the eviction storage. The buffer may store a hit data for all lookups performed in the eviction storage, each with an indication of whether the lookup resulted in a hit or a miss. Alternatively, the buffer may store hit data for a subset of the lookups, e.g. only those that result in a hit. Accordingly, the history storage circuitry can provide a detailed history of how many hits have occurred in the eviction storage as well as which entries were hit.

In some examples, hit data is allocated to the hit storage circuitry in response to a first hit on a given entry during a predetermined sampling period. In other words, if a plurality of lookups hit on the same entry, then hit data is allocated only on the first hit. This recognises that some workloads may attempt to use certain control information in bursts, such that several lookups are performed in quick succession, thereby resulting in several hits or misses. By only allocating hit data in respect of the first of such lookups, the available capacity in the hit storage circuitry can be more effectively utilised.

The mode control circuitry may employ various activation metric or deactivation metrics, e.g. such as the utilisation metric and/or the eviction storage hit rate metric, for controlling the lookup handling circuitry to activate or deactivate the parallel mode. The activation metric and the deactivation metric may be checked against an activation condition and a deactivation condition respectively in order to determine whether either condition is satisfied and then controls the lookup handling circuitry accordingly.

Some specific examples may include a symmetric control scheme in which the activation metric and deactivation metric are the same metric, e.g. one of the utilisation metric or eviction storage hit rate metric described above. Other examples may alternatively include an asymmetric control scheme in which the activation metric and deactivation metric are different metrics, e.g. the activation metric is the eviction storage hit rate metric and the deactivation metric is the utilisation metric, or vice versa. The use of these various metrics in different combinations provide more flexible control of the lookup handling circuitry.

In some examples, the mode control circuitry determines whether the activation condition and deactivation condition are satisfied based on a comparison with an activation threshold and a deactivation threshold respectively. To satisfy each condition, a metric may be required to be greater than or less than the respective threshold depending on the particular implementation and the metric used. As an illustrative example, the utilisation metric is used as the deactivation metric and the deactivation condition is satisfied when the utilisation metric indicates that less than the maximum capacity of the control information storage is being utilised. Accordingly, if the utilisation metric indicates that less than a threshold capacity is being utilised by the current workload, then as described above the additional capacity provided in the parallel mode is not necessary. The mode control circuitry therefore determines that the utilisation metric is less than the deactivation threshold, thereby satisfying the deactivation condition and controlling the lookup handling circuitry to operate in the serial mode.

In some examples, it is more desirable to operate with the improved performance of the parallel mode than to save power in the serial mode. Accordingly, the mode control circuitry may set the activation condition to be more easily satisfied than the deactivation condition. In this way, as a given workload changes, the mode control circuitry may be faster to switch to the parallel mode to improve performance where possible, and slower to switch back to the serial mode.

In some examples, certain events that occur during a given workload may be taken as indicators that certain control information is no longer useful. In particular, control information held by the control information storage and the eviction storage may be specific to a particular processing context. Accordingly, if a context switch occurs, the control information may no longer be of any use for the new context. In such examples, the mode control circuitry may be responsive to the occurrence of a context switch to cause the lookup handling circuitry to switch from the parallel mode to the serial mode or if already in the serial mode, to stay in the serial mode.

In some examples, the eviction storage may have a larger capacity than the control information storage and/or a different indexing scheme than the control information storage.

In some examples, the apparatus is further provided with result combination circuitry that receives the results of the lookup operations performed in each of the control information storage and the eviction storage. The result combination circuitry determines what is to be returned as a response to the lookup request based on the operating mode of the lookup handling circuitry. In particular, if the lookup handling circuitry is operating in the parallel mode, the result combination circuitry receives a first lookup result from the control information storage and a second lookup result from the eviction storage and generates a final lookup result as the response.

If, however, the lookup handling circuitry is operating in the serial mode, the result combination circuitry may simply forward the first lookup result from the control information storage as the response to the lookup request. If the first lookup result from the control information storage is a miss, then some examples of the result combination circuitry may be dependent on particular timing constraints associated with the lookup request. In examples with more strict timing constraints, a miss in the control information storage may cause a miss to be returned as a response to the lookup request regardless of whether a subsequent lookup in the eviction storage results in a hit. Accordingly, a response is provided more quickly and the timing constraints can still be met. The miss response may then cause control information to be fetched from memory or cause a data processing operation to be controlled based on default behaviour. After a miss has occurred and a response has been provided to the lookup request (or in parallel with the response being provided to the lookup request), the lookup in the eviction storage is still performed. In some examples, the lookup in the eviction storage is used to update a metric, such as the utilisation metric or the eviction storage hit rate metric described above. Alternatively, or in addition, a hit in the eviction storage may cause the hit entry to be reallocated back to the control information storage. Accordingly, if a lookup request directed to that entry is received in future, the entry will be available in the control information storage.

In examples with less strict timing constraints, the subsequent lookup in the eviction cache may be performed before the result combination circuitry provides a response to the lookup request. Accordingly, a hit entry in the eviction cache may still be provided as a response to the lookup request when in the serial mode in some examples.

As mentioned above, the present techniques may be applied to various different types of control information storage. In some examples, the control information storage is a memory address translation cache, e.g. a translation lookaside buffer, and the control information includes address translations between virtual addresses and physical addresses, between virtual addresses and intermediate physical addresses, or between intermediate physical addresses and physical addresses. The additional effective capacity of the address translation cache provided while in the parallel mode therefore increases the number of address translations that can be cached, thereby reducing the likelihood of incurring the additional latency and power usage of performing, e.g. a page table walk to obtain the address translation. In other examples, the control information storage is a prediction cache, e.g. a branch prediction cache or data value prediction cache. Accordingly, the control information may include branch direction predictions, branch target predictions, or data value predictions. In each of these examples, the present techniques may be applied to handle lookup requests in a parallel mode or a serial mode with an associated eviction storage. The lookup requests may therefore be in respect of any data or control information that is cached in any of these examples.

The present techniques may also be applied to a data cache and an associated eviction cache. The lookup request described above may therefore be triggered by a load operation performed by processing circuitry, where the load operation is targeting a data value located at a target memory address. As described above, the lookup request to the cache and the eviction cache may be handled in parallel mode or in a serial mode depending on the control of the mode control circuitry.

Specific examples are now explained with reference to the drawings.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of execution units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory. If a required page table entry is not present in the TLB 38, then the MMU 36 may perform a page table walk to obtain the page table entry from the page table structure stored in memory. The TLB 38 corresponds to one example of the control information storage defined in the appended claims. The MMU 36 may also maintain an eviction TLB (not shown) in which page table entries that are evicted from the TLB 38 may be temporarily cached.

In this example, the memory system include a level one data cache 30, the level one instruction cache 8, a shared level two cache 32 and main system memory 34. It will be appreciated that this is just one example of a possible memory hierarchy and other arrangements of caches can be provided. The specific types of execution unit 20 to 28 shown in the execute stage 16 are just one example, and other implementations may have a different set of execution units or could include multiple instances of the same type of execution unit so that multiple micro-operations of the same type can be handled in parallel. It will be appreciated that FIG. 1 is merely a simplified representation of some components of a possible processor pipeline architecture, and the processor may include many other elements not illustrated for conciseness.

The apparatus 2 also has a branch predictor 40 which may include one or more branch prediction caches 42 for caching prediction information used to form predictions of branch behaviour of branch instructions to be executed by the branch unit 24. The predictions provided by the branch predictor 40 may be used by the fetch stage 6 to determine the sequence of addresses from which instructions are to be fetched from the instruction cache 8 or memory system. If the prediction information stored in the prediction caches 42 are not sufficient to form a prediction, e.g. due to a lack of historical information relating to a given branch instruction, the branch predictor may instead form a default prediction, e.g. that the branch is not taken and the instruction continue to be fetched sequentially from memory. The branch prediction caches 42 may include a number of different forms of cache structure, including a branch target buffer (BTB) which may cache entries specifying predictions of whether certain blocks of addresses are predicted to include any branches, and if so, the instruction address offsets (relative to the start address of the block) and predicted target addresses of those branches. Also the branch prediction caches 42 could include branch direction prediction caches which cache information for predicting, if a given block of instruction addresses is predicted to include at least one branch, whether the at least one branch is predicted to be taken or not taken. The BTB and the branch direction prediction caches each correspond to one example of the control information storage defined in the appended claims. Also the branch prediction caches 42 could include an eviction cache for temporarily caching entries that have been evicted from the BTB and/or branch direction prediction caches.

The apparatus 2 also has a data predictor 44 which may include one or more data prediction caches 46 for caching prediction information used to form predictions of data that is expected to be fetched by a load instruction executed by the load/store unit 28. The predictions provided by the data predictor 44 may be used by the load/store unit 28 to provide a predicted data value in advance of the actual data value being fetched from the memory system. The predicted data value can be used as an operand for a subsequent pending micro-operation so that the micro-operation can be issued by the issue stage 12 before the actual data value has been fetched from the memory system. As above, if the prediction information is not sufficient to form a data prediction, a default behaviour may be that no prediction is provided. The data prediction caches 46 may include a data value prediction cache for caching entries specifying prediction information and predicted data values associated with a particular memory address. The data value prediction cache corresponds to one example of the control information cache defined in the appended claims. Also the data prediction caches 46 may include an eviction cache for temporarily caching entries that have been evicted from the data value prediction cache.

Hence, the data processing system may include a number of cache structures, including for example the data cache 30, instruction cache 8, level 2 cache 32, TLB 38, branch prediction caches 42 and/or data prediction caches 46. Each type of cache structure may further be provided with respective eviction caches for temporarily caching evicted entries. It will be appreciated that other types of cache structure could also be provided.

The following examples will refer generally to the control information storage, which as mentioned above, may correspond to any one or more of the TLB 38, the branch prediction caches 42, and the data prediction caches 46. Despite referring only to the control information storage for conciseness, it will nonetheless be appreciated that the following examples of the present techniques may be applied to a cache such as the data cache 30, instruction cache 8, and/or level 2 cache 32.

Figure 2:
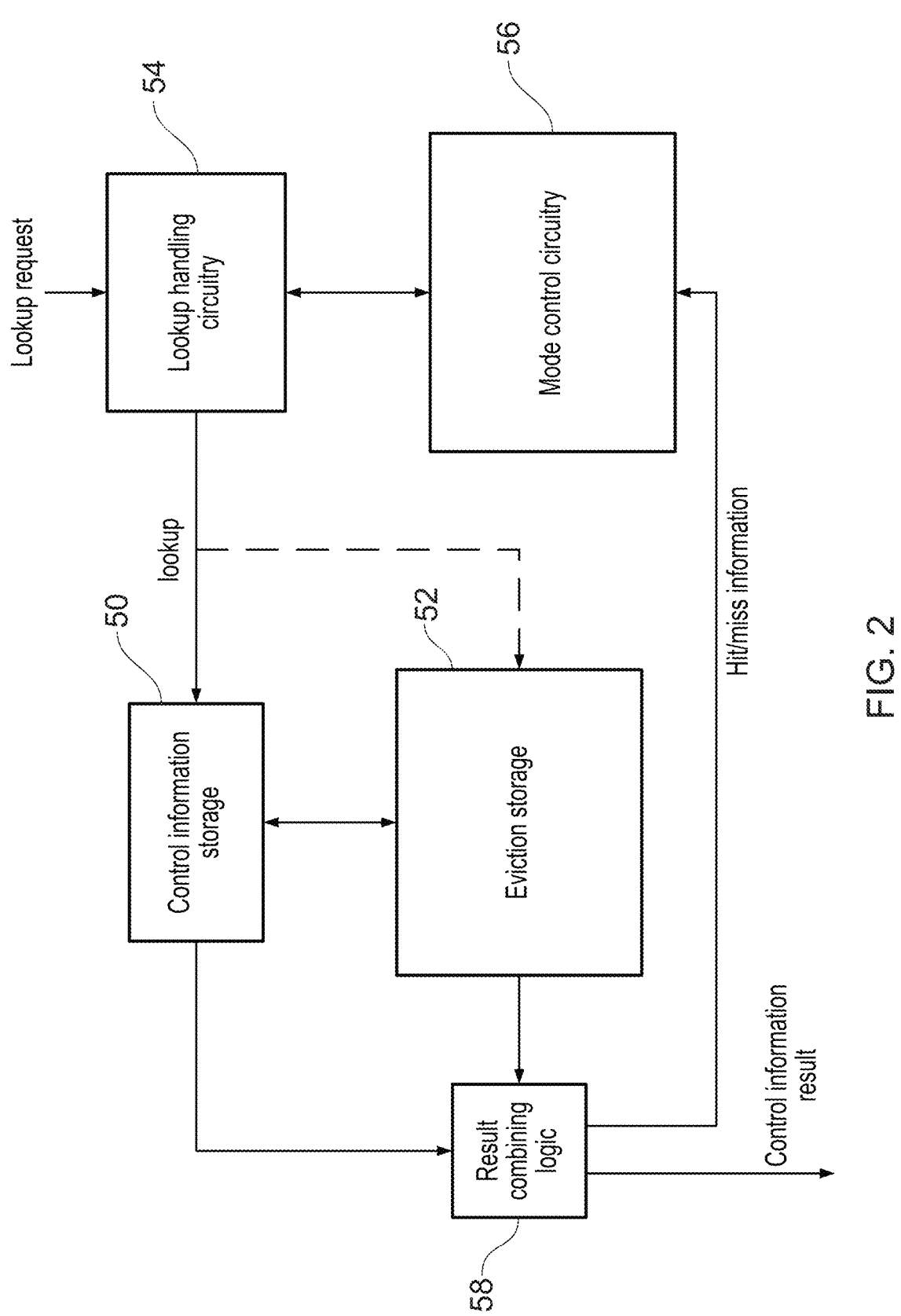
FIG. 2 illustrates an example apparatus comprising mode control circuitry.

FIG. 2 illustrates an apparatus according to the present techniques that may be implemented in the data processing apparatus 2. The apparatus comprises control information storage 50 for storing entries of control information for controlling data processing operations relating to a given memory address, and eviction storage 52 for storing entries that have been evicted from the control information storage 50. In this example, the eviction storage 52 has a larger capacity than the control information storage 50.

The apparatus further comprises lookup handling circuitry 54 which receives lookup requests for data corresponding to a target memory address. The lookup request may be generated in a variety of ways depending on the cache structure to which the present techniques are being applied. For example, the lookup request may be generated as part of generating a prediction by the branch predictor 40 or the data predictor 44 or as part of an address translation performed by the MMU 36. The lookup handling circuitry 54 is configured to operate in one of two modes under the control of mode control circuitry 56.

In a serial mode, the lookup handling circuitry 54 causes the control information storage 50 to perform the lookup request to determine whether the requested control information is currently cached. If the lookup request results in a hit, i.e. the requested control information is cached, the control information is returned as a response to the lookup request. If the lookup request results in a miss, i.e. the requested control information is not cached, then the lookup handling circuitry 54 causes the lookup request to be performed in the eviction storage 52. If the lookup in the eviction storage 52 results in a hit, then the matched entry may optionally be re-allocated back to the control information storage 50. A miss signal is returned as a response to the lookup request, which may cause the control information to be fetched from memory 34 or a default behaviour to be used.

In a parallel mode, the lookup handling circuitry 54 causes the control information storage 50 and the eviction storage 52 to perform the lookup request in parallel, effectively behaving as a single storage structure with the combined capacity of both the control information storage 50 and the eviction storage 52. If there is a hit in either of the control information storage and the eviction storage, the results are received by result combining logic 58, which then generates a control information result that is provided as a response to the lookup request. For example, if there is a miss in the control information storage 50 and a hit in the eviction storage 52, the result combining logic uses the matching entry of the eviction storage 52 to generate the control information result.

The result combination logic 58 further provides hit and miss information from both the control information storage 50 and the eviction storage 52 to the mode control circuitry 56. The mode control circuitry 56 may then use this information for controlling which mode the lookup handling circuitry is to operate in.

When in the parallel mode, new control information can be allocated to the control information storage 50 in response to a miss occurring in both the control information storage 50 and in the eviction storage 52. In particular, the miss may trigger the new control information to be fetched from memory or generated based on a history of outcomes associated with the target memory address. It will be appreciated that this would operate similarly to a miss having occurred in a single structure with the combined capacity of both the control information storage 50 and the eviction storage 52.

When in the serial mode, new control information can be allocated to the control information storage 50 in response to a miss occurring in at least the control information storage 50. As mentioned above, the new control information may be fetched from memory or generated based on a history of outcomes. Alternatively, the control information may be resulting from a hit in the eviction storage 52, in which case the control information may be re-allocated back into the control information storage 50.

It will be appreciated that, as new control information is allocated to the control information storage 50, other control information will be evicted, for example based on an eviction policy (least-recently-used, first-in-first-out, etc). As described above, the control information that is evicted from the control information storage 50, as long as it is still valid control information, is allocated to the eviction storage 52.

Figure 3:
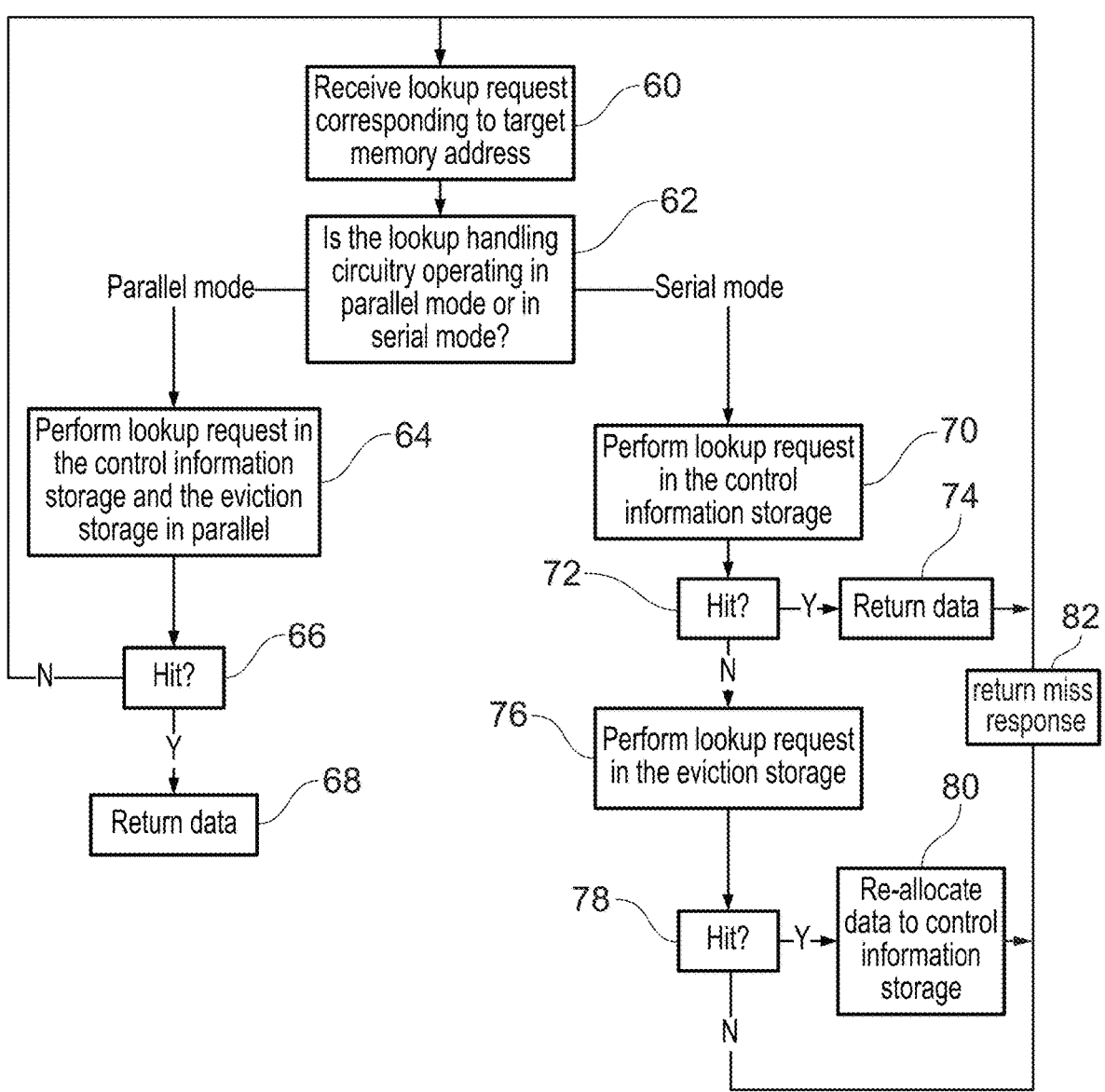
FIG. 3 illustrates a sequence of steps for handling a lookup request in a parallel mode or a serial mode.

FIG. 3 illustrates a sequence of steps for handling a lookup request. At step 60, a lookup request corresponding to a target memory address is received by the lookup handling circuitry 54. At step 62, it is determined whether the lookup handling circuitry 54 is operating in the parallel mode or in the serial mode.

If operating in the parallel mode, then the lookup request is performed in the control information storage 50 and the eviction storage 52 in parallel at step 64. At step 66, it is determined whether there is a hit or not. Since the lookup request is being performed in parallel, a hit could occur in either the control information storage 50 or the eviction storage 52. If there is a hit, then the data from the hit entry of either the control information storage 50 or the eviction storage 52 is returned as a response to the lookup request in step 68. If there is not a hit, i.e. there is a miss, then no data is returned in response to the lookup request. The process then returns to step 60 for the next lookup request. As an additional optional step, a lookup request resulting in a miss may trigger a new entry to be allocated to the control information storage 50. For example, new control information can be fetched from memory or generated based on a history of outcomes associated with the target memory address.

If operating in the serial mode, then the lookup request is performed in the control information storage 50 at step 70. At step 72, it is determined whether there is a hit in the control information storage 50 or not. If so, then the data is returned as a response to the lookup request at step 74 and the method returns to step 60 for processing a subsequent lookup request.

If there is not a hit in the control information storage 50, then the lookup request is performed in the eviction storage 52 at step 76. At step 78, it is determined whether there is a hit in the eviction storage 52 or not. If there is a hit in the eviction storage 52, then data may be re-allocated to the control information storage 50 at step 80. In some examples, re-allocation may be further dependent on other conditions, or may not occur at all. For example, an entry may have to be hit by several lookup requests before being re-allocated to the control information storage. Regardless of whether or not a hit in the eviction storage is detected in step 78, a miss response 82 is returned in response to the lookup when there is a miss in the control information storage 50 in serial mode. The miss response may, depending on the purpose of the control information storage, trigger an action such as looking up a further level of cache, triggering a translation table walk operation, or making a prediction based on a default behaviour. After returning the miss response, the process returns to step 60.

Accordingly, the present techniques shown in the above examples allow a cache structure to be dynamically controlled to provide either improved performance associated with increased effective capacity or a power saving by reserving a lookup in the eviction storage 52 as a response to a miss in the control information storage 50.

Figure 4:
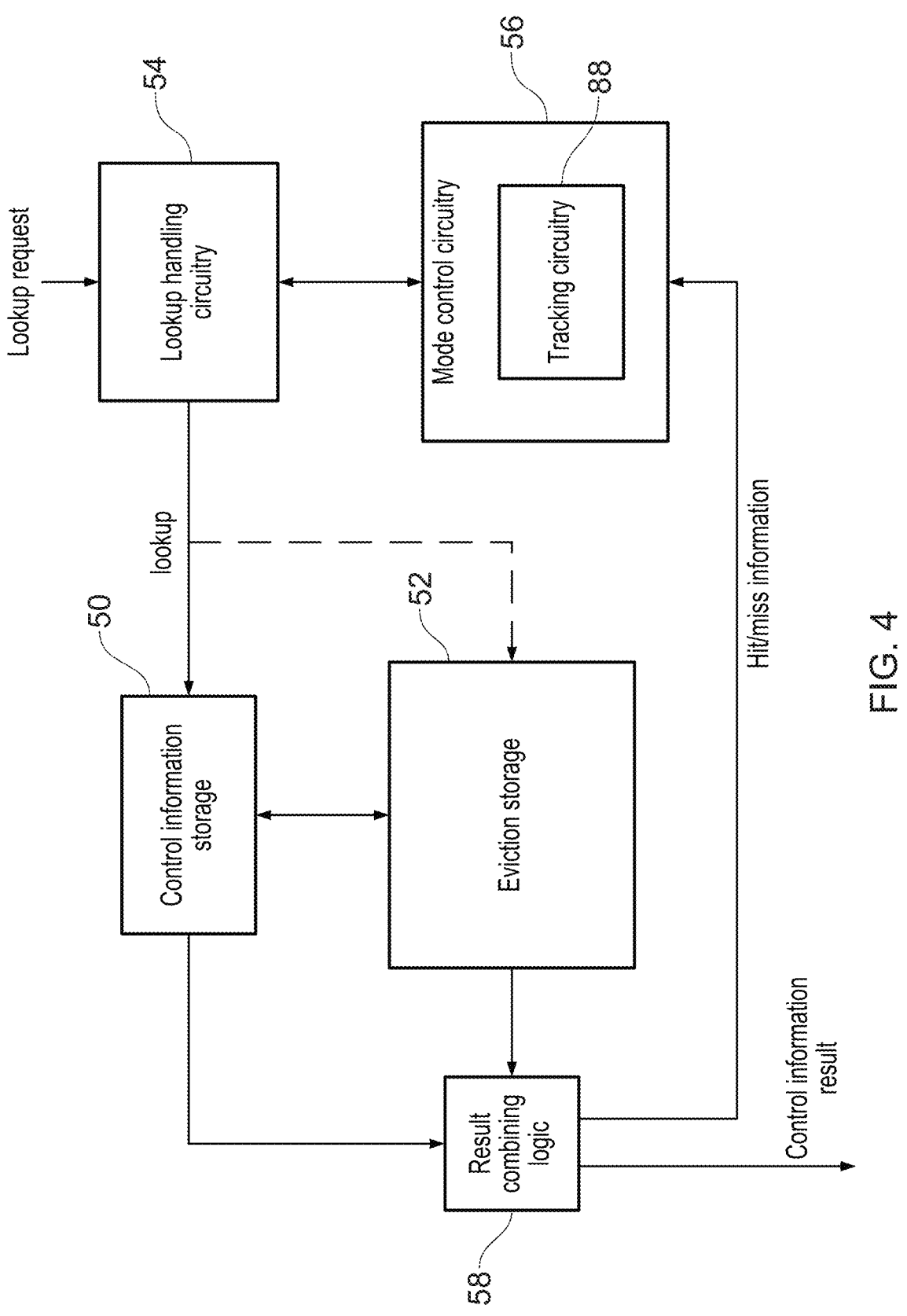
FIG. 4 illustrates an example apparatus comprising tracking circuitry.

FIG. 4 illustrates a more specific example of the apparatus shown in FIG. 2, in which the mode control circuitry is provided with tracking circuitry 88 for tracking the utilisation of the control information storage 50 and the eviction storage 52 and setting a utilisation metric. The utilisation metric may be set based on a number of hits that have occurred during a predetermined sample period. The number of hits may be tracked, for example, by maintaining a bitmap representative of each entry in the control information storage 50 and in the eviction storage 52, where each bit in the bitmap is set in response to a hit on a corresponding entry.

The utilisation metric may be used as an indication of how much capacity is required of the control information storage 50. For example, if the number of hits in a predetermined sample period is equal to or greater than the total capacity of the control information storage 50, then it can be determined that the capacity of the control information storage is insufficient to handle the demand of a current workload. Accordingly, it would be preferable to increase the available capacity of the control information storage 50 so that more entries can be cached. Therefore, the mode control circuitry 56 uses the utilisation metric to cause the lookup handling circuitry 54 to operate in the parallel mode to make use of the capacity in the eviction storage 52.

Conversely, if the number of hits in a predetermined sample period is less than the total capacity of the control information storage 50, then the additional capacity is not needed. Therefore, the mode control circuitry 56 uses the utilisation metric to cause the lookup handling circuitry 54 to operate in the serial mode to save power.

It will be appreciated therefore that the utilisation metric may vary depending on a current workload that is being executed by the data processing apparatus 2. For example, in a workload where frequent memory accesses across a large number of unique page addresses in memory are being performed, utilisation of the TLB 38 would be high due to the frequent memory address translations that would be performed. The MMU 36 would therefore benefit from the TLB 38 having a larger effective capacity for storing more page table entries for faster addresses translation. Therefore, there would be a performance improvement by controlling the lookup handling circuitry 54 to operate in a parallel mode, such that a TLB 38 and an eviction TLB (corresponding to the control information storage 50 and eviction storage 52) are looked up in parallel.

Figure 5:
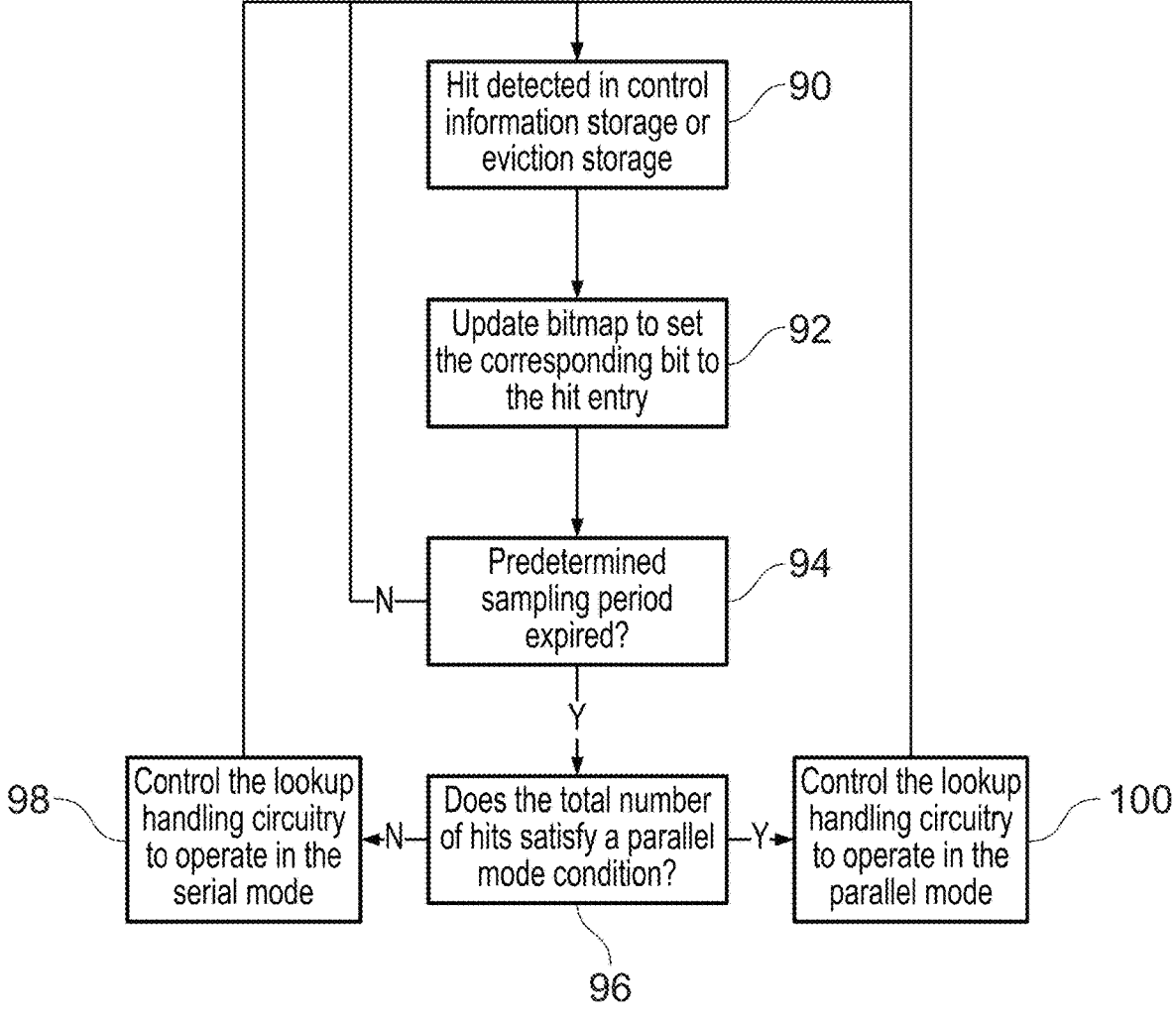
FIG. 5 illustrates a sequence of steps for controlling the lookup handling circuitry based on a utilisation metric.

FIG. 5 illustrates a sequence of steps for maintaining the utilisation metric. At step 90, a hit is detected in the control information storage 50 or eviction storage 52. In step 92, a bitmap maintained by the tracking circuitry 88 is updated to set a bit corresponding to the hit entry. At step 94, it is determined whether the predetermined sampling period has expired. If not, then steps 90 and 92 are repeated as more hits are detected.

When the predetermined sampling period does expire at step 94, the number of hit entries may be counted by assessing how many set bits are present in the bitmap. At step 96, it is determined whether the number of hit entries satisfies a parallel mode condition, e.g. exceeding a threshold. If not, then at step 98, the mode control circuitry 56 controls the lookup handling circuitry 54 to operate in the serial mode. If the parallel mode condition is satisfied, then at step 100, the mode control circuitry 56 controls the lookup handling circuitry 54 to operate in the parallel mode.

Figure 6:
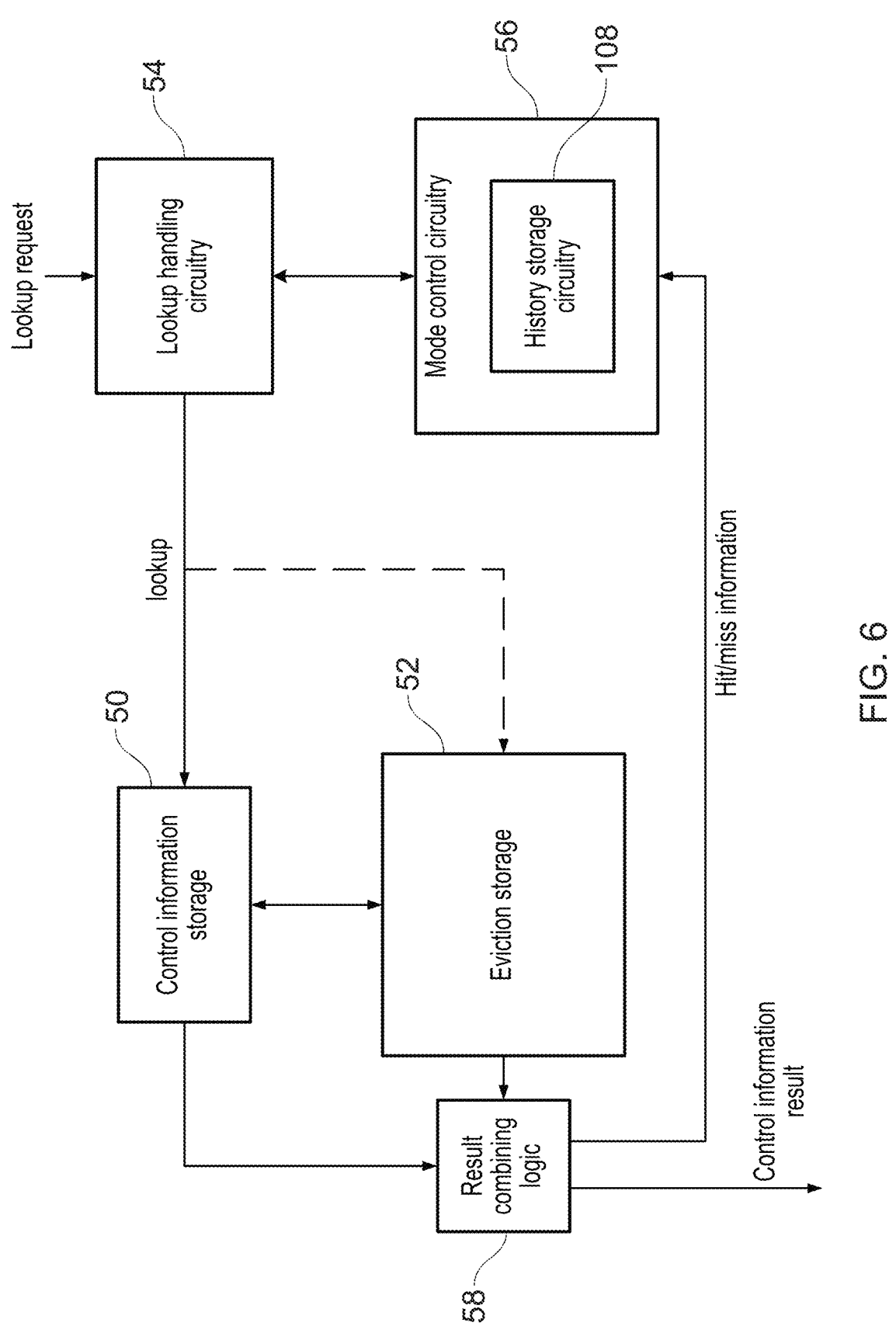
FIG. 6 illustrates an example apparatus comprising history storage circuitry.

FIG. 6 illustrates another specific example of the apparatus shown in FIG. 2, in which the mode control circuitry 56 is provided with history storage circuitry 108 for tracking a fraction of lookup requests in the eviction storage 52 that detect a hit and setting an eviction storage hit rate metric. The eviction storage hit rate metric has a particular advantage when the lookup handling circuitry 54 is operating in the serial mode, because a lookup request performed in the eviction storage 52 is already known to have missed in the control information storage 50. Therefore, the eviction storage hit rate metric provides an indication of whether the eviction storage 52 contains useful entries that cannot be located in the control information storage 50. If so, then it can be useful to switch to the parallel mode in order to make use of those useful entries in the eviction storage 52. Nonetheless, the eviction storage hit rate metric may also be used during the parallel mode to determine if the entries in the eviction storage are no longer useful, thereby indicating that the parallel mode is not worth the additional power usage.

The history storage circuitry 108 may take a variety of forms, and in some examples comprises a counter that is indicative of a number of hits in the eviction storage. The number of hits can then be compared against a total number of lookups that had been performed in the eviction storage 52 during a predetermined sampling period to derive the fraction of lookup requests that detect a hit. It will be appreciated that the predetermined sampling period does not need to be the same period as that used for measuring the utilisation metric, e.g. in step 94 of FIG. 5. The value of the counter may therefore provide an estimate of the fraction of lookup requests in the eviction storage 52 that detect a hit, for example based on a number of lookup requests that are expected to occur in each sampling period.

Figure 7A:
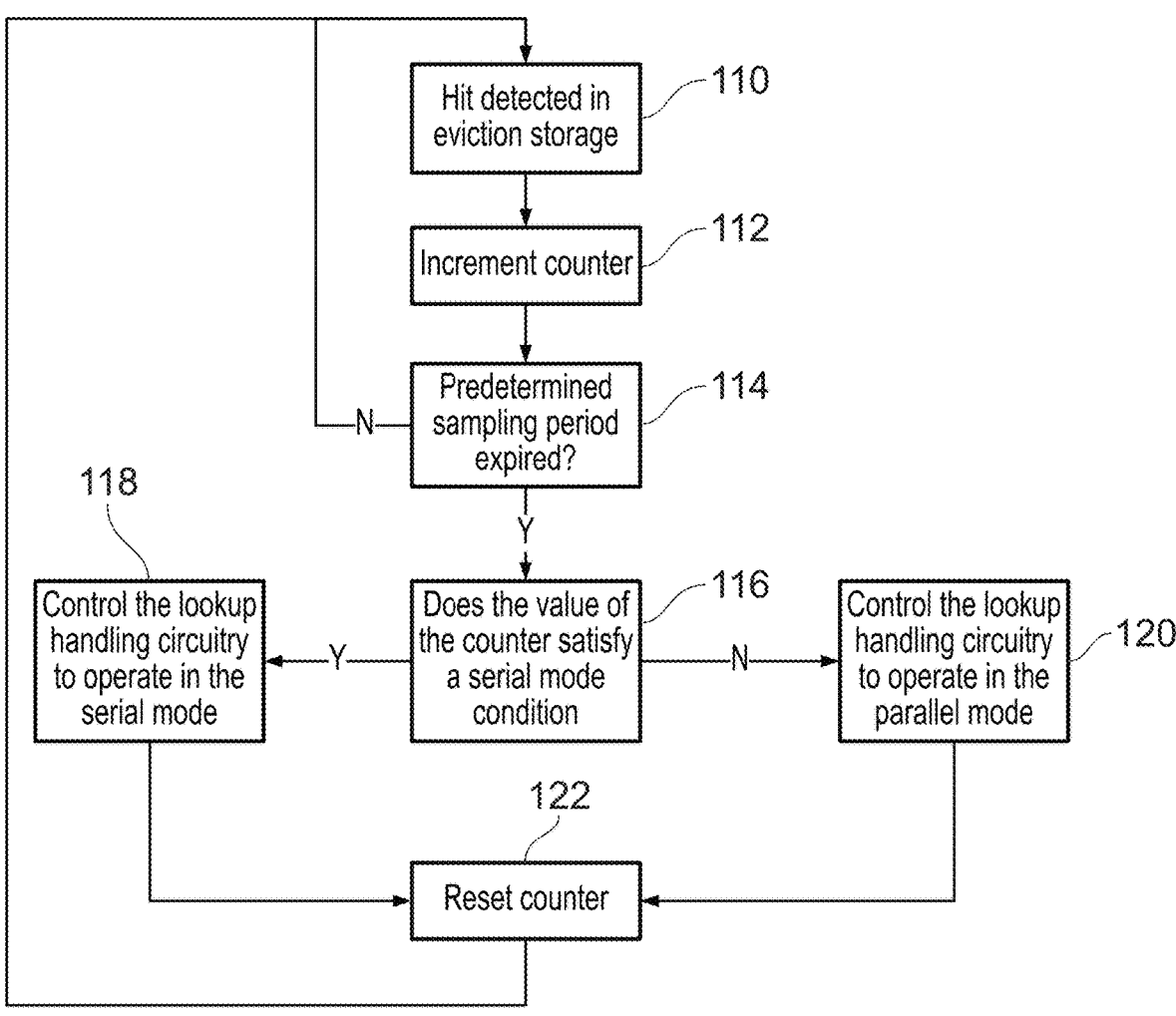
FIGS. 7A and 7B illustrate sequences of steps for controlling the lookup handling circuitry based on an eviction storage hit rate metric.

FIG. 7A illustrates a sequence of steps for controlling the lookup handling circuitry based on the eviction storage hit rate metric according to some examples where the history storage circuitry 108 comprises a counter. At step 110, a hit is detected in the eviction storage 52. At step 112, the history storage circuitry 108 increments the value of the counter. At step 114, it is then determined whether the predetermined sample period has expired. If not, then steps 110 to 112 are repeated as more hits are detected.

When the predetermined sample period does expire at step 116, it is determined whether the value of the counter satisfies a serial mode condition, e.g. not exceeding a threshold. If the serial condition is satisfied, then at step 118, the mode control circuitry 56 controls the lookup handling circuitry 54 to operate in the serial mode. Otherwise, if the serial condition is not satisfied, then at step 120, the mode control circuitry 56 controls the lookup handling circuitry 54 to operate in the parallel mode. After step 118 or 120, the counter is reset in step 122 to begin counting hits for the next sampling period.

Returning to FIG. 6, other examples of the history storage circuitry 108 comprise a buffer for storing a hit history indicative of entries that have been hit in the eviction storage. The buffer may be implemented such that older hit history is continually overwritten by new hit history, e.g. a ring buffer. Accordingly, the fraction of hits that occur within the time taken to update the entire hit history (thereby defining the predetermined sampling time) corresponds to a proportion of the hit history that indicates a hit has occurred. The eviction storage hit rate metric can then be set accordingly.

Figure 7B:
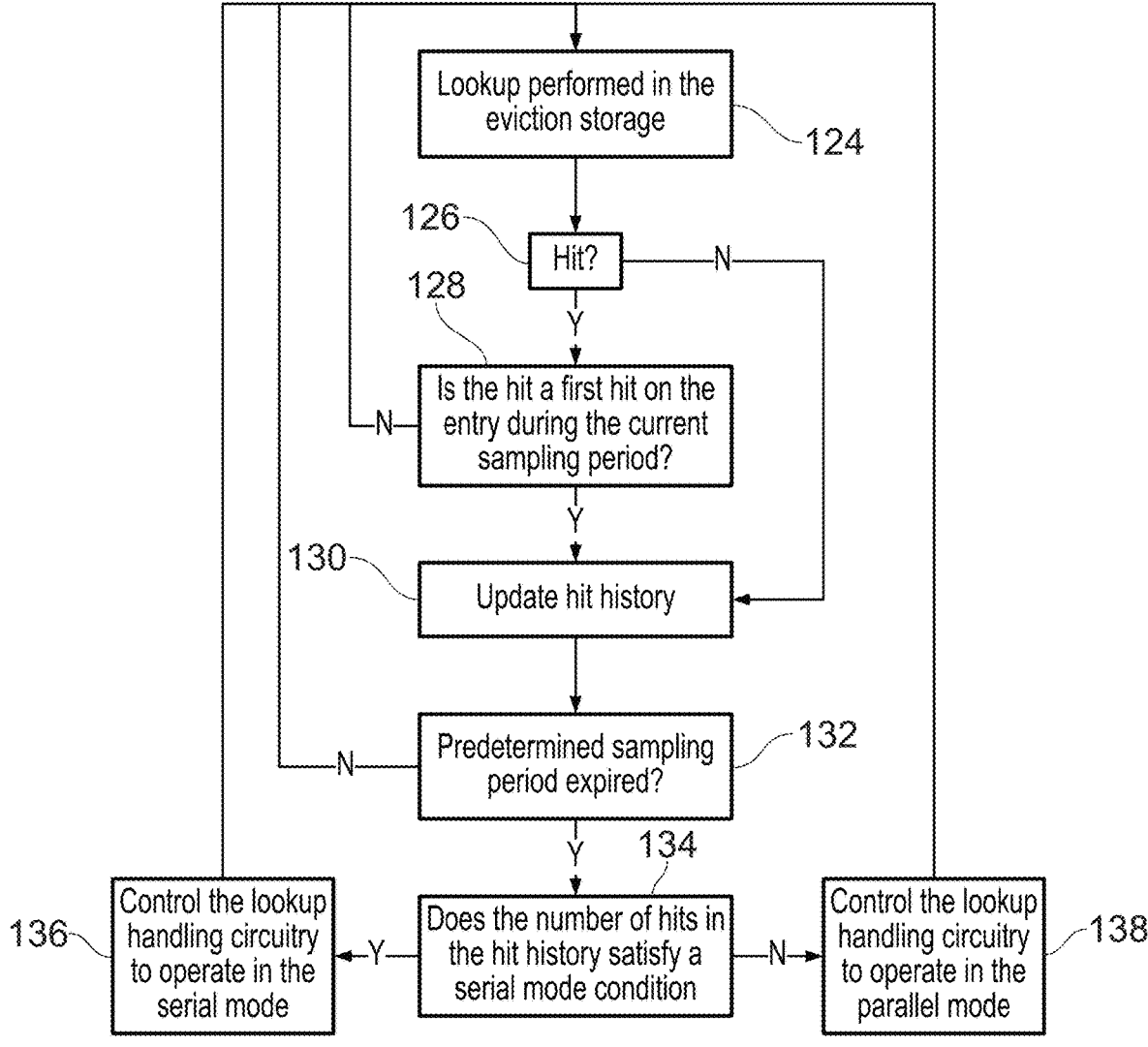

FIG. 7B illustrates a sequence of steps for controlling the lookup handling circuitry based on the eviction storage hit rate metric according to examples where the history storage circuitry 108 comprises a hit history buffer. A lookup is performed in the eviction storage 52 at step 124 and it is determined whether the lookup results in a hit at step 126.

At step 128, it is determined whether the hit is a first hit on the entry during the current sampling period. If not, then no update is made to the hit history. This is because some workloads may cause a number of lookup requests directed to the same target memory address in a burst. In such a scenario, a lookup performed in the control information storage 50 would miss several times, although there was really only one instance of the control information needing to be fetched. Therefore, recording multiple hits on an entry in history storage circuitry 108 may influence the eviction storage hit rate metric to overestimate the usefulness of the entries in the eviction storage 52. Accordingly, if the hit is the first hit on the entry during the current sampling period, then the history is updated at step 130. In some examples, the determination of step 128 may not be required, and the hit history may be updated every time a hit occurs, instead of only on a first hit.

At step 132, it is then determined whether the predetermined sample period has expired. If not, then steps 124 to 130 are repeated as more lookup requests are performed in the eviction storage 52. When the predetermined sample period does expire at step 132, then it is determined whether the number of hits in the hit history satisfy a serial mode condition at step 134. The serial mode condition may be that the fraction of lookups that result in a hit does not exceed a threshold. If the serial mode condition is satisfied, then at step 136, the mode control circuitry 56 controls the lookup handling circuitry 54 to operate in the serial mode. Otherwise, if the serial condition is not satisfied, then at step 138, the mode control circuitry 56 controls the lookup handling circuitry 54 to operate in the parallel mode.

The metrics described in the previous examples may be used alone, providing symmetric control where the same metric is used for switching between the parallel mode and serial mode. Alternatively, the metrics may be used together to provide asymmetric control where one metric is used for activation of the parallel mode, and another metric is used for activation of the serial mode (i.e. deactivation of the parallel mode).

Figure 8:
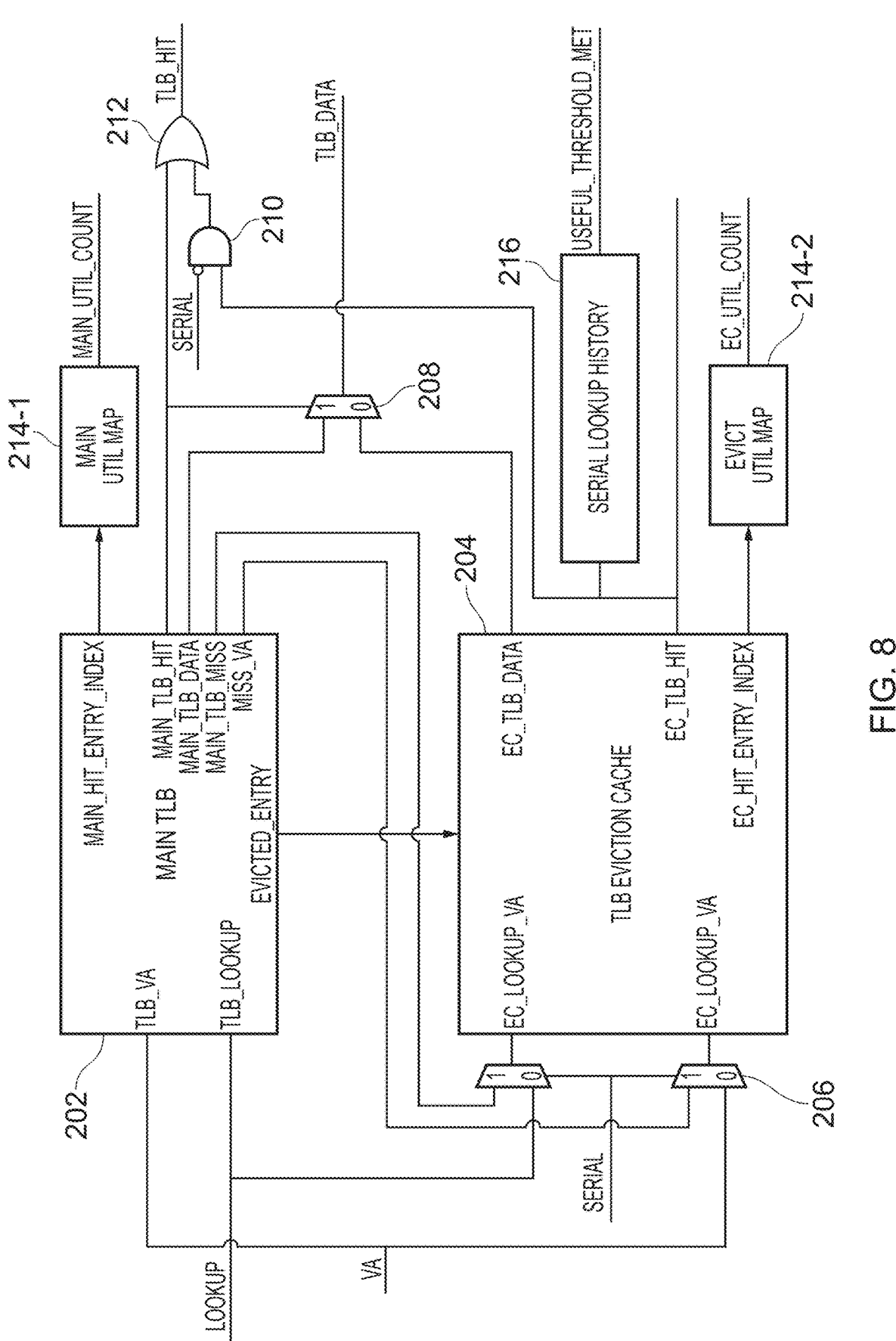
FIG. 8 illustrates an example of signalling within an apparatus.

FIG. 8 illustrates an example where both of the previously described metrics are implemented for the purpose of controlling how lookup requests are performed in a main TLB 202 and a TLB eviction cache 204 (corresponding to the control information storage 50 and eviction storage 52 of previous examples respectively). It will be appreciated that other suitable metrics may be used in various combinations for the purpose of asymmetric control, and need not be specifically the utilisation metric and eviction storage hit rate metric described previously.

When a lookup request is received, the request signal and the virtual address are input to the TLB_LOOKUP and TLB_VA ports of the main TLB 202. The lookup may then be performed in the main TLB 202 regardless of whether the parallel mode or serial mode is active.

The lookup and virtual address are also sent to multiplexers 206 which, when in the parallel mode, cause the lookup request and the virtual address to be sent the TLB eviction cache 204 for the lookup to be performed in parallel. When in the serial mode, the multiplexers 206 receive a MAIN_TLB_MISS signal and MISS_VA signal from the main TLB 202 if the lookup results in a miss. The TLB eviction cache 204 then performs the lookup in response to those signals indicative of the lookup in the main TLB 202 missing.

Hits in the main TLB 202 or the TLB eviction cache 204 result in hit signals and the matching data being sent to the result combining logic comprising a multiplexer 208, an AND gate 210 and an OR gate 212. The multiplexer 208 receives the data from a hit entry in the main TLB 202 or the TLB eviction cache 204, and outputs either of these as the TLB_DATA in a response to the lookup request.

The hit signal, EC_TLB_HIT, from the TLB eviction cache 204 is sent to the AND gate 210, which also receives a NOT serial signal, i.e. signalling true in the parallel mode and false in the serial mode. Accordingly, the AND gate 210 outputs the EC_TLB_HIT signal if there is a hit in the TLB eviction cache 204 and the parallel mode is active. The hit signal is then combined in the OR gate 212 with a hit signal, MAIN_TLB_HIT, from the main TLB 202. Therefore, if a hit occurs in either the main TLB 202 or the TLB eviction cache 204 in the parallel mode, then a hit signal is output by the OR gate 212. If the serial mode is active, then the EC_TLB_HIT signal from the TLB eviction cache 204 is not output by the AND gate 210, meaning that only a hit in the main TLB 202 can be output as a hit signal.

When a hit occurs in the main TLB 202, the hit entry index is output to a main utilisation map 214-1 comprising a bitmap representative of each entry in the main TLB 202. Similarly, whenever a hit occurs in the TLB eviction cache 204, the hit entry index is output to an eviction utilisation map 214-2 comprising a bitmap representative of each entry in the TLB eviction cache 204. The utilisation maps 214-1, 214-2 output a utilisation count that is indicative of the utilisation of the main TLB 202 and the TLB eviction cache 204, thereby providing the utilisation metric described in previous examples for use, for example as the deactivation metric. It will be appreciated that the main utilisation map 214-1 and the eviction utilisation map 214-2 may be combined into a single utilisation map that determines a single utilisation count.

Furthermore, when a hit occurs in the TLB eviction cache 204 during the serial mode, the hit signal is sent to the serial lookup history 216 which records the hit history of lookups performed in the TLB eviction cache 204. From the hit history, it can be determined what fraction of lookups performed in the TLB eviction cache 204 result in a hit. If the determined fraction is greater than a threshold, then an indication may be output that a threshold fraction has been met, thereby providing the eviction storage hit rate metric described in previous examples for use, for example as the activation metric.

In accordance with the present techniques, mode control circuitry (not shown in FIG. 8) may use the output signals from the utilisation maps 214-1, 214-2 and the serial lookup history 216 to control whether the lookups should be handled in the serial mode or in the parallel mode. In particular, the signal from the serial lookup history 216 may be used to determine whether the TLB eviction cache 204 contains useful entries, e.g. because a high fraction of lookups result in a hit. Accordingly, the mode control circuitry may cause the lookup handling circuitry, such as the multiplexers 206, to switch to the parallel mode to make use of those useful entries and improve performance. As a given workload progresses, the utilisation count from the utilisation maps 214-1, 214-2 may indicate that the total utilisation of the main TLB 202 and TLB eviction cache 204 could be supported with the capacity of the main TLB 202 alone. Accordingly, the mode control circuitry may cause the lookup handling circuitry to switch to the serial mode to save power that otherwise would have been used for parallel lookups.

Therefore, in this example, the use of both metrics allow for more flexible control of when to switch from the parallel mode to the serial mode or vice versa. In some examples, the threshold for the serial lookup history may be relatively low, such that it is easier for the threshold to be met by a given workload. This allows the apparatus to be quicker to switch to the parallel mode than to switch to the serial mode, thereby improving the access to the improved performance of the parallel mode.

Figure 9:
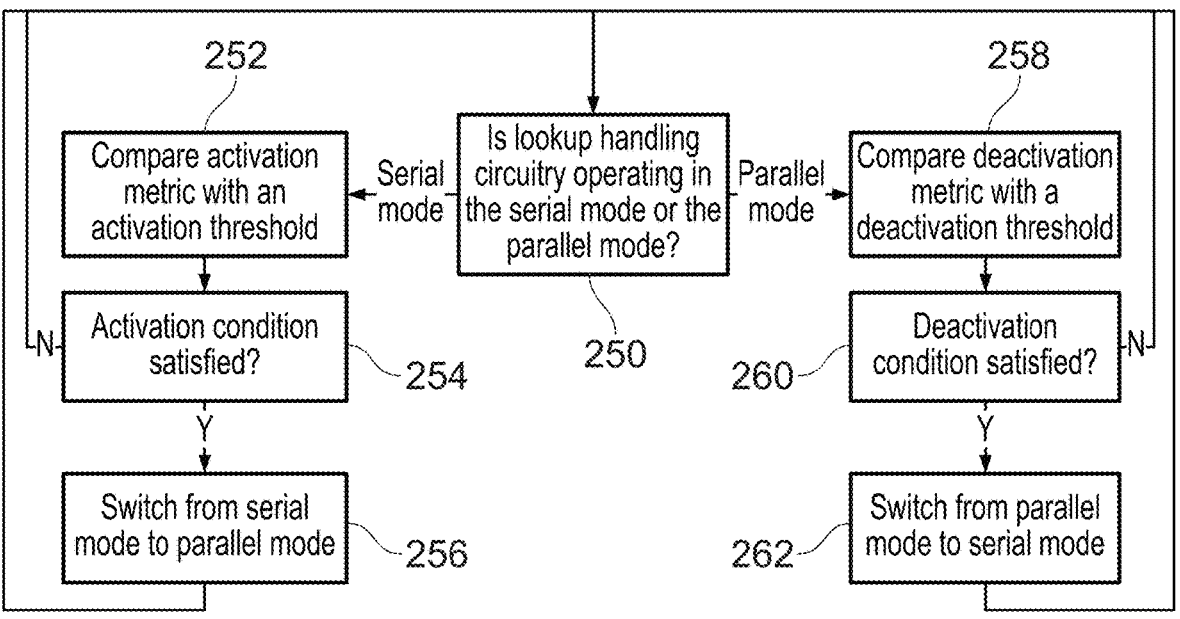
FIG. 9 illustrates a sequence of steps for controlling the lookup handling circuitry based on an activation metric and a deactivation metric.

FIG. 9 illustrates a series of steps for controlling the mode of the lookup handling circuitry 54 based on an activation metric and a deactivation metric, which may be the same or may be different as in the example of FIG. 8. At step 250, it is determined whether the lookup handling circuitry 54 is operating in the serial mode or in the parallel mode. If in the serial mode, then at step 252, an activation metric is compared with an activation threshold. For example, this may involve comparing the fraction of lookups performed in the eviction storage 52 that result in a hit to a threshold fraction. Based on the comparison, it is determined whether an activation condition has been satisfied at step 254. For example, the activation condition is satisfied if the fraction of lookups that result in a hit exceeds the threshold fraction. If the activation condition is not satisfied, then the lookup handling circuitry 54 continues to operate in the serial mode. However, if the activation condition is satisfied, then at step 256, the lookup handling circuitry 54 switches to operating in the parallel mode.

Returning to step 250, if the lookup handling circuitry 54 is operating in the parallel mode, then at step 258, a deactivation metric is compared with a deactivation threshold. For example, this may involve comparing the utilisation of the control information storage 50 and the eviction storage 52 with a threshold utilisation. Based on the comparison, it is determined whether a deactivation condition has been satisfied at step 260. For example, the deactivation condition is satisfied if the utilisation of the control information storage 50 and the eviction storage 52 is below the threshold utilisation. If the deactivation condition is not satisfied, then the lookup handling circuitry 54 continues to operate in the parallel mode. However, if the deactivation condition is satisfied, then at step 262, the lookup handling circuitry 54 switches to operating in the serial mode.

Figure 10:
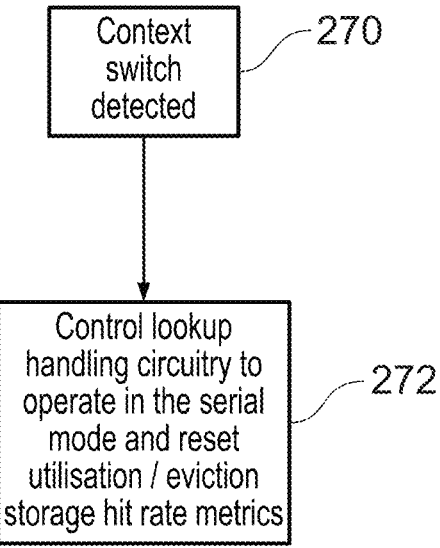
FIG. 10 illustrates a sequence of steps for controlling the lookup handling circuitry based on a context switch.

The mode control circuitry 56 may also be responsive to other input signals for controlling the mode of the lookup handling circuitry, one example being when a context switch occurs. Since the control information, e.g. the page table entries stored by the TLB 38 or the prediction information stored by the branch prediction caches 42 and data prediction caches 46, are often specific to a particular context, a context switch may be taken as an indication that the control information is no longer of use. FIG. 10 illustrates a sequence of steps for controlling the lookup handling circuitry 54 based on a context switch. The process begins at step 270, where a context switch is detected. This may occur at any time, such that the lookup handling circuitry 54 may be operating in either the parallel mode or the serial mode when the context switch is detected. At step 272, the lookup handling circuitry 54 is controlled to operate in the serial mode, either by switching to the serial mode (if currently in the parallel mode) or maintaining the serial mode (if currently in the serial mode). Furthermore, in examples where utilisation metrics and/or eviction storage hit rate metrics are used, the metrics are reset to an initial value to begin measuring the utilisation and/or eviction storage hit rate metrics for the new context.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
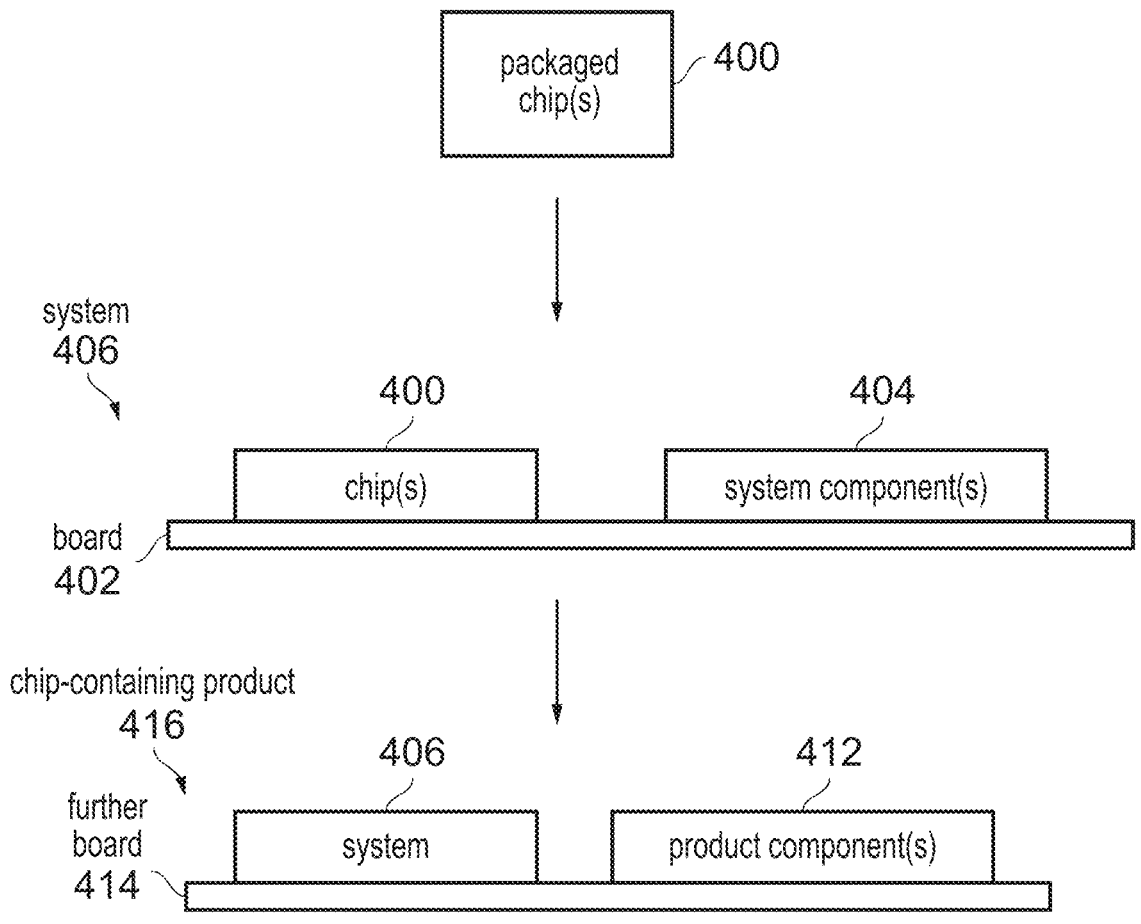
FIG. 11 illustrates a system and a chip-containing product.

As shown in FIG. 11, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus comprising:
    control information storage configured to store a plurality of entries of control information for controlling data processing operations relating to a given memory address;
    eviction storage configured to store a plurality of entries that have been evicted from the control information storage;
    lookup handling circuitry configured to control handling of a lookup request for data corresponding to a target memory address, wherein:
        in a parallel mode, the lookup handling circuitry is configured to control the control information storage and the eviction storage to perform the lookup request in parallel; and
        in a serial mode, the lookup handling circuitry is configured to control the control information storage to perform the lookup request, and to control the eviction storage to perform the lookup request in response to the lookup request missing in the control information storage; and
    mode control circuitry configured to control whether the lookup handling circuitry is to operate in the parallel mode or the serial mode.

(2) The apparatus of clause (1), wherein the mode control circuitry is configured to maintain a utilisation metric indicative of a utilisation of the control information storage and the eviction storage and to control whether the lookup handling circuitry is to operate in the parallel mode or the serial mode in dependence on the utilisation metric.

(3) The apparatus of clause (2), wherein mode control circuitry is configured to monitor a number of hits in the control information storage and the eviction storage during a predetermined sample period and to set the utilisation metric based on the number of hits.

(4) The apparatus of clause (2) or clause (3), wherein the mode control circuitry comprises tracking circuitry configured to track the utilisation of the control information storage and the eviction storage based on at least one bitmap representative of the plurality of entries in the control information storage and the plurality of entries in the eviction storage.

(5) The apparatus of clause (4), wherein
    the tracking circuitry is responsive to a hit signal indicative of a given entry in the control information storage or the eviction storage to set a corresponding bit in the bitmap; and
    in response to expiry of a predetermined sample period, the mode control circuitry is configured to set the utilisation metric based on the number of set bits in the bitmap.

(6) The apparatus of clause (1), wherein, at least in the serial mode, the mode control circuitry is configured to maintain an eviction storage hit rate metric indicative of a fraction of lookup requests in the eviction storage that detect a hit, and to control whether the lookup handling circuitry is to operate in the parallel mode or the serial mode in dependence on the eviction storage hit rate metric.

(7) The apparatus of clause (6), wherein
    the mode control circuitry comprises a counter, the value of the counter being indicative of the number of hits in the eviction storage; and
    the mode control circuitry is configured to reset the counter upon expiry of a predetermined sampling period.

(8) The apparatus of clause (6), wherein the mode control circuitry comprises history storage circuitry configured to store a hit history indicative of entries that have been hit in the eviction storage.

(9) The apparatus of clause (8), wherein the history storage circuitry comprises a buffer to hold hit data indicative of entries that have been hit in the eviction storage.

(10) The apparatus of clause (9), wherein the history storage circuitry is configured to allocate hit data indicative of a given entry to the buffer in response to a first hit on the given entry during a predetermined sampling period.

(11) The apparatus of clause (1), wherein the mode control circuitry is configured to control the lookup handling circuitry to switch from the serial mode to the parallel mode in response to an activation metric satisfying an activation condition; and
    the mode control circuitry is configured to control the lookup handling circuitry to switch from the parallel mode to the serial mode in response to a deactivation metric satisfying a deactivation condition.

(12) The apparatus of clause (11), wherein
    the mode control circuitry is configured to determine that the activation condition is satisfied based on a comparison of the activation metric with an activation threshold; and
    the mode control circuitry is configured to determine that the deactivation condition is satisfied based on a comparison of the deactivation metric with a deactivation threshold.

(13) The apparatus of clause (11) or clause (12), wherein the mode control circuitry is configured to set the activation condition to be more easily satisfied than the deactivation condition.

(14) The apparatus of any preceding clause, wherein the mode control circuitry is responsive to an occurrence of a context switch to cause the lookup handling circuitry to operate in the serial mode.

(15) The apparatus of any preceding clause, wherein the eviction storage is configured to have one or more of:
   a larger capacity than the control information storage; and
   a different indexing scheme than the control information storage.

(16) The apparatus of any preceding clause, comprising result combination circuitry configured to, while the lookup handling circuitry is operating in the parallel mode, receive a first lookup result from the control information storage and a second lookup result from the eviction storage, and to generate a final lookup result as a response to the lookup request.

(17) The apparatus of any preceding clause, wherein the control information storage is any one of:
   a memory address translation cache;
   a prediction cache.

(18) The apparatus of any preceding clause, wherein while the lookup handling circuitry is operating in the serial mode, the eviction storage is responsive to a lookup request hitting in the eviction storage to cause a hit entry of control information to be reallocated to the control information storage.

(19) A system comprising:
   the apparatus of any preceding clause, implemented in at least one packaged chip;
   at least one system component;
   and a board,
   wherein the at least one packaged chip and the at least one system component are assembled on the board.

(20) A chip-containing product comprising the system of clause (19), wherein the system is assembled on a further board with at least one other product component.

(21) A method comprising:
   storing, in control information storage, a plurality of entries of control information for controlling data processing operations relating to a given memory address;
   storing, in eviction storage, a plurality of entries that have been evicted from the control information storage;
   controlling handling of a lookup request for data corresponding to a target memory address, wherein:
      in a parallel mode, controlling the control information storage and the eviction storage to perform the lookup request in parallel; and
      in a serial mode, controlling the control information storage to perform the lookup request, and to control the eviction storage to perform the lookup request in response to the lookup request missing in the control information storage; and
   controlling whether the lookup handling circuitry is to operate in the parallel mode or the serial mode.

(22) A non-transitory computer-readable medium storing computer-readable code for fabrication of an apparatus comprising:
   control information storage configured to store a plurality of entries of control information for controlling data processing operations relating to a given memory address;

eviction storage configured to store a plurality of entries that have been evicted from the control information storage;
   lookup handling circuitry configured to control handling of a lookup request for data corresponding to a target memory address, wherein:
      in a parallel mode, the lookup handling circuitry is configured to control the control information storage and the eviction storage to perform the lookup request in parallel; and
      in a serial mode, the lookup handling circuitry is configured to control the control information storage to perform the lookup request, and to control the eviction storage to perform the lookup request in response to the lookup request missing in the control information storage; and
   mode control circuitry configured to control whether the lookup handling circuitry is to operate in the parallel mode or the serial mode.

(23) An apparatus comprising:
   a cache configured to store a plurality of entries of data;
   an eviction cache to store a plurality of entries that have been evicted from the cache;
   lookup handling circuitry configured to control handling of a lookup request for data corresponding to a target memory address, wherein:
      in a parallel mode, the lookup handling circuitry is configured to control the cache and the eviction cache to perform the lookup request in parallel; and
      in a serial mode, the lookup handling circuitry is configured to control the cache to perform the lookup request, and to control the eviction cache to perform the lookup request in response to the lookup request missing in the cache; and
   mode control circuitry configured to control whether the lookup handling circuitry is to operate in the parallel mode or the serial mode.

(24) A method comprising:
   storing, in a cache, a plurality of entries of data;
   storing, in an eviction cache, a plurality of entries that have been evicted from the cache;
   controlling handling of a lookup request for data corresponding to a target memory address, wherein:
      in a parallel mode, controlling the cache and the eviction cache to perform the lookup request in parallel; and
      in a serial mode, controlling the cache to perform the lookup request, and to control the eviction cache to perform the lookup request in response to the lookup request missing in the cache; and
   controlling whether the lookup handling circuitry is to operate in the parallel mode or the serial mode.

(25) A non-transitory computer-readable medium storing computer-readable code for fabrication of an apparatus comprising:
   a cache configured to store a plurality of entries of data;
   an eviction cache to store a plurality of entries that have been evicted from the cache;
   lookup handling circuitry configured to control handling of a lookup request for data corresponding to a target memory address, wherein:
      in a parallel mode, the lookup handling circuitry is configured to control the cache and the eviction cache to perform the lookup request in parallel; and
      in a serial mode, the lookup handling circuitry is configured to control the cache to perform the lookup request, and to control the eviction cache to perform the lookup request in response to the lookup request missing in the cache; and mode control circuitry configured to control whether the lookup handling circuitry is to operate in the parallel mode or the serial mode.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
control information storage configured to store a plurality of entries of control information for controlling data processing operations relating to a given memory address;
eviction storage configured to store a plurality of entries that have been evicted from the control information storage;
lookup handling circuitry configured to control handling of a lookup request for data corresponding to a target memory address, wherein:
in a parallel mode, the lookup handling circuitry is configured to control the control information storage and the eviction storage to perform the lookup request in parallel; and
in a serial mode, the lookup handling circuitry is configured to control the control information storage to perform the lookup request, and to control the eviction storage to perform the lookup request in response to the lookup request missing in the control information storage; and
mode control circuitry configured to control whether the lookup handling circuitry is to operate in the parallel mode or the serial mode.

2. The apparatus of claim 1, wherein the mode control circuitry is configured to maintain a utilisation metric indicative of a utilisation of the control information storage and the eviction storage and to control whether the lookup handling circuitry is to operate in the parallel mode or the serial mode in dependence on the utilisation metric.

3. The apparatus of claim 2, wherein the mode control circuitry is configured to monitor a number of hits in the control information storage and the eviction storage during a predetermined sample period and to set the utilisation metric based on the number of hits.

4. The apparatus of claim 2, wherein the mode control circuitry comprises tracking circuitry configured to track the utilisation of the control information storage and the eviction storage based on at least one bitmap representative of the plurality of entries in the control information storage and the plurality of entries in the eviction storage.

5. The apparatus of claim 4, wherein
the tracking circuitry is responsive to a hit signal indicative of a given entry in the control information storage or the eviction storage to set a corresponding bit in the bitmap; and
in response to expiry of a predetermined sample period, the mode control circuitry is configured to set the utilisation metric based on the number of set bits in the bitmap.

6. The apparatus of claim 1, wherein, at least in the serial mode, the mode control circuitry is configured to maintain an eviction storage hit rate metric indicative of a fraction of lookup requests in the eviction storage that detect a hit, and to control whether the lookup handling circuitry is to operate in the parallel mode or the serial mode in dependence on the eviction storage hit rate metric.

7. The apparatus of claim 6, wherein
the mode control circuitry comprises a counter, the value of the counter being indicative of the number of hits in the eviction storage; and
the mode control circuitry is configured to reset the counter upon expiry of a predetermined sampling period.

8. The apparatus of claim 6, wherein the mode control circuitry comprises history storage circuitry configured to store a hit history indicative of entries that have been hit in the eviction storage.

9. The apparatus of claim 8, wherein the history storage circuitry is configured to allocate hit data indicative of a given entry in response to a first hit on the given entry during a predetermined sampling period.

10. The apparatus of claim 1, wherein the mode control circuitry is configured to control the lookup handling circuitry to switch from the serial mode to the parallel mode in response to an activation metric satisfying an activation condition; and
the mode control circuitry is configured to control the lookup handling circuitry to switch from the parallel mode to the serial mode in response to a deactivation metric satisfying a deactivation condition.

11. The apparatus of claim 10, wherein
the mode control circuitry is configured to determine that the activation condition is satisfied based on a comparison of the activation metric with an activation threshold; and
the mode control circuitry is configured to determine that the deactivation condition is satisfied based on a comparison of the deactivation metric with a deactivation threshold.

12. The apparatus of claim 10, wherein the mode control circuitry is configured to set the activation condition to be more easily satisfied than the deactivation condition.

13. The apparatus of claim 1, wherein the mode control circuitry is responsive to an occurrence of a context switch to cause the lookup handling circuitry to operate in the serial mode.

14. The apparatus of claim 1, wherein the eviction storage is configured to have one or more of:
a larger capacity than the control information storage; and
a different indexing scheme than the control information storage.

15. The apparatus of claim 1, comprising result combination circuitry configured to, while the lookup handling circuitry is operating in the parallel mode, receive a first lookup result from the control information storage and a second lookup result from the eviction storage, and to generate a final lookup result as a response to the lookup request.

16. The apparatus of claim 1, wherein the control information storage is any one of:

a memory address translation cache;

a prediction cache.

17. A system comprising:

the apparatus of claim 1, implemented in at least one packaged chip;

at least one system component;

and a board, wherein the at least one packaged chip and the at least one system component are assembled on the board.

18. A chip-containing product comprising the system of claim 17, wherein the system is assembled on a further board with at least one other product component.

19. A method comprising:

storing, in control information storage, a plurality of entries of control information for controlling data processing operations relating to a given memory address;

storing, in eviction storage, a plurality of entries that have been evicted from the control information storage;

controlling handling of a lookup request for data corresponding to a target memory address, wherein:

in a parallel mode, controlling the control information storage and the eviction storage to perform the lookup request in parallel; and in a serial mode, controlling the control information storage to perform the lookup request, and to control the eviction storage to perform the lookup request in response to the lookup request missing in the control information storage; and controlling whether the lookup handling circuitry is to operate in the parallel mode or the serial mode.

20. An apparatus comprising:

a cache configured to store a plurality of entries of data;

an eviction cache to store a plurality of entries that have been evicted from the cache;

lookup handling circuitry configured to control handling of a lookup request for data corresponding to a target memory address, wherein:

in a parallel mode, the lookup handling circuitry is configured to control the cache and the eviction cache to perform the lookup request in parallel; and in a serial mode, the lookup handling circuitry is configured to control the cache to perform the lookup request, and to control the eviction cache to perform the lookup request in response to the lookup request missing in the cache; and mode control circuitry configured to control whether the lookup handling circuitry is to operate in the parallel mode or the serial mode.

* * * * *